United States Patent Office 3,489,559
Patented Jan. 13, 1970

3,489,559
COMPONENTS FOR ELECTROPHOTOGRAPHIC COMPOSITIONS AND PROCESSES
Philip C. Clark, Wilbur L. Kite, Jr., and Frederick W. Sanders, Chillicothe, Ohio, assignors to The Mead Corporation, Dayton, Ohio, a corporation of Ohio
No Drawing. Filed May 28, 1965, Ser. No. 459,922
Int. Cl. G03g 5/08
U.S. Cl. 96—1.5    3 Claims

ABSTRACT OF THE DISCLOSURE

The present invention relates to electrophotographic layers prepared by applying to a suitable substrate an aqueous ammoniacal composition containing a photoconductive pigment, an electrically insulating binder therefor, a synthetic polymer or copolymer containing OH or COOH groups which in the presence of ammonia becomes a dispersant and stabilizing agent for said pigment and said binder, and a cross-linking agent for said OH and said COOH groups. Electrophotographic layers of such composition have been found to be particularly useful when employed under conditions of high relative humidity.

---

This invention relates to improved components for electrophotographic compositions and process and more particularly to components of such compositions, processes and products derived from or utilizing aqueous systems and to novel dispersing, stabilizing and sensitizing materials for use therein.

One of the major problems confronting the use of latex in dielectric coatings is loss of dielectric strength at high relative humidity (70%). The same problem occurs with the use of common dispersants for minerals in pigmented dielectric coatings.

The reason for the loss of dielectric strength at high relative humidity is that the surfactants used to disperse the mineral pigment, or to stabilize the latex against high shear are hydrophilic. Thus, the coating adsorbs water as a function of RH (relative humidity), the dielectric properties of the coating decrease as a consequence. This effect can be so severe that a latex coating may not hold a charge at 25% relative humidity.

Generally, non-ionic surfactants are superior to ionic surfactants for dielectric coatings. Adding cross-linking materials such as Parez 613 (melamine formaldehyde) may or may not improve the high humidity results. It generally helps, but does not solve the problem with non-ionic surfactants.

Heretofore, there have been relatively few commercially available latices that can be used in electrophotographic compositions and it has also been found that relatively few materials are available that will adequately disperse the pigment or stabilize the latex component of such compositions.

In general, the present invention employs a synthetic polymer or copolymer containing a minimum number of hydroxyl or carboxyl groups and which is water-soluble or is soluble in ammoniacal solutions as a dispersant for the pigment portions and as a stabilizer for the minor portions of electrophotographic compositions. This material is introduced into such compositions in such a way that it is rendered non-water sensitive thus avoiding adverse affects to dielectric strength at high relative humidity conditions, thus providing compositions which provide good printing results.

For a better understanding of the present invention, reference is now made to the following description in which the various examples set forth therein are given by way of illustration and not of limitation.

EXAMPLE 1

120 grams of water, 20 grams of wood rosin and 25 grams of 28% ammonium hydroxide were mixed and heated to 170° F. The mixture was cooled to room temperature.

70 grams of the above solution was added to 70 grams of dry photoconductive zinc oxide and mixed resulting in a smooth low viscosity slip.

To this zinc oxide slip was added 28 grams of a 50% solids dispersion of polyvinyl acetate which had been dispersed during manufacture with a small quantity of polyvinyl alcohol.

To the above mixture was then added 2.6 grams of an 80% solids solution of melamine formaldehyde resin (Parez 613 from American Cyanamid). The resulting coating composition was coated onto a suitable basestock and yielded excellent prints when printed in the standard electrophotographic manner over a broad range of high humidity conditions, the results being substantially better than those obtained under the same conditions from an identical coating composition which did not contain the cross-linking agent.

EXAMPLE 2

100 grams of dry carboxylated polyvinyl acetate beads were mixed with 775 grams of water and to this mixture was added 100 grams of 28% ammonium hydroxide and 25 grams of denatured ethyl alcohol. The resulting mixture was heated with agitation to 150° F. until solution of the polyvinyl acetate was complete and then cooled to room temperature.

700 grams of photoconductive zinc oxide was kneaded in a Z-bar mixer with 105 grams of the above prepared polyvinyl acetate solution and 12.5 grams of an 88% solution of melamine formaldehyde resin. This brought the materials in the mixer to a hard knead. Additional water was added, as necessary, to control the knead. After continuing the kneading for 45 minutes additional water was added to break the knead, heat being used if necessary. The resulting zinc oxide slip was well dispersed and fluid.

The above prepared zinc oxide slip was then blended with 208 grams of 48% styrene-butadiene latex (Dow 636, Dow Chemical Co.) The resulting coating composition was stable and when used for production of electrophotographic coatings and prints prepared therefrom by conventional methods yielded excellent prints over a wide range of high relative humidity conditions, and appreciably superior to those obtained under identical conditions when the melamine-formaldehyde was omitted from the coating composition.

EXAMPLE 3

180 grams of dry carboxylated polyvinyl acetate beads (Gelva C–5 V–16, Shawinigan Resins Corp.) were placed in a Z-bar mixer. To this was added 400 grams of water and 11 grams of 28% ammonium hydroxide, 38 grams of 80% solids Parez 613 and 45 grams of ethyl alcohol. This was mixed until a solution was obtained.

To the above solution was added 1321 grams of photoconductive zinc oxide and a good knead resulted. Additional water may be added to control the knead. Kneading was continued for 45 minutes at the end of which time water was added to break the knead.

A good coating color resulted due to the dispersing action of the carboxylated polyvinyl acetate which in this coating acted as both the binder and the dispersing agent. This coating mix was coated on a suitable basestock and excellent prints were obtained over a broad range of humidities when imaged by standard electrophotographic means.

EXAMPLE 4

To 20 grams of bleached shellac (Gillespie-Rodgers-Piatt) was added 80 grams of water and 3 grams of 28% ammonium hydroxide. The above was cooked under agitation at 140° F. until solution was complete, and cooled to room temperature.

The procedure of Example 3 was followed except at the end of the knead, 100 grams of the above solution was added instead of water. The resulting coating mix had different rheological properties and improved dispersion over the coating mix of Example 3 due to the use of the shellac dispersant.

The coating mix was coated on a suitable basestock and printed by standard electrophotographic means. Excellent print results were obtained over a broad humidity range.

EXAMPLE 5

To 20 grams of a carboxyl containing polyester (Shanco L-1158 from Shanco Plastic and Chemical, Inc.) were added 120 grams of water and 3 grams of 28% ammonium hydroxide. This was cooked under agitation until solution was complete, after which it was cooled to room temperature. The procedure of Example 4 was followed except that 143 grams of the above solution was used in place of 100 grams of the shellac solution and equally good results were obtained.

Through the use of a synthetic polymer or copolymer containing a minimum number of hydroxyl or carboxyl groups in accordance with the invention, the polymer is rendered water soluble or soluble in ammoniacal solutions. Such polymer or copolymer is then used in kneading or mixing the zinc oxide pigment. In the case of a stabilizing agent or surfactant for latices, this material can be added with a monomer before polymerization or in the post-stabilization stage to the polymer itself. These materials can be subsequently reacted with 1.3–2.1%, by weight, based on the total solids content of the coating composition, of materials such as melamine formaldehyde resin (Parez 613), urea formaldehyde (UF-85), or other cross-linking agents to reduce the water sensitivity of the OH and/or COOH groups, and in the case of the carboxyl groups these can be made water-insoluble by providing an excess amount of zinc oxide which is usually present in the coating color.

This results in improved high humidity response because the surfactant or the dispersant is no longer water-sensitive and thus is not harmful to the dielectric strength at high relative humidity.

Thus it will be seen that there are provided water-soluble materials or ammoniacal-soluble materials than can be used for dispersants for zinc oxide pigments or for surfactants for the stabilization of latices in electrophotographic compositions. These materials are then insolubilized by cross-linking or other types of reactants to render their hydroxyl or carboxyl groups insoluble and thus water insensitive at high relative humidities which results in good printing results.

While particular embodiments of the invention have been described, it will be understood by those skilled in the art that various modifications and/or equivalents may be employed without departing from the invention, and it is intended in the appended claims to cover all such changes and modifications that fall within the true spirit and scope of the invention.

What is claimed is:

1. Compositions for the production of electrophotographic layers comprising an aqueous ammoniacal composition containing a photoconductive pigment, an electrically insulating binder, a material selected from the group consisting of water- or ammonia-soluble polymers and copolymers containing OH or COOH groups, which in the presence of ammonia become dispersants and stabilizers for said pigment and said binder, and 1.3–2.1%, by weight, of a cross-linking agent for said OH and COOH groups, based on the total weight of the solids of said composition and selected from the group consisting of melamine-formaldehyde resin and urea-formaldehyde resin.

2. Compositions according to claim 1, wherein said polymer or copolymer containing OH or COOH groups is selected from the group consisting of resin, carboxylated polyvinyl acetate and polyesters containing unneutralized carboxyl groups.

3. Electrophotographic recording elements comprising a substrate on at least one side of which is a dried layer comprising a photoconductive pigment, and electrically insulating binder and a material selected from the group consisting of water- or ammonia-soluble polymers and copolymers containing OH or COOH groups, which groups have been cross-linked with 1.3 to 2.1%, by weight, of a cross-linking agent, based on the total solid content of said layer and selected from the group consisting of melamine-formaldehyde resin and urea-formaldehyde resin.

References Cited

UNITED STATES PATENTS

| | | | |
|---|---|---|---|
| 3,404,979 | 10/1968 | Bonjour | 96—1.8 |
| 2,959,481 | 11/1960 | Kucera | 96—1.8 |
| 2,993,787 | 7/1961 | Sugarman | 96—1.8 |
| 3,160,503 | 12/1964 | Cady | 96—1.8 |
| 3,234,160 | 2/1966 | Matsubayashi | 260—29.6 |
| 3,241,958 | 3/1966 | Bornarth et al. | 96—1.8 |
| 3,306,743 | 2/1967 | Sanders | 96—1.8 |
| 3,306,743 | 2/1967 | Sanders | 96—1.8 |

GEORGE F. LESMES, Primary Examiner

C. E. Van HORN, Assistant Examiner

U.S. Cl. X.R.

96—1.8; 260—27, 29.4